United States Patent [19]

Andra et al.

[11] Patent Number: 4,873,887
[45] Date of Patent: Oct. 17, 1989

[54] TORSION-VIBRATION DAMPER

[75] Inventors: Rainer Andra, Limburg; Klaus Kurr, Weinheim-Hohensachsen; Gunter Ullrich, Hemsbach; Udo Dorge, Laudenbach, all of Fed. Rep. of Germany

[73] Assignee: Firma Carl Freudenberg, Weinheim/Bergstrasse, Fed. Rep. of Germany

[21] Appl. No.: 117,792

[22] Filed: Nov. 5, 1987

[30] Foreign Application Priority Data

Nov. 15, 1986 [DE] Fed. Rep. of Germany ....... 3639190

[51] Int. Cl.$^4$ .............................................. F16F 15/10
[52] U.S. Cl. .................... 74/573 F; 74/574; 464/83; 464/180
[58] Field of Search ..................... 74/573 F, 574, 572; 464/89 X, 87, 180 X

[56] References Cited

U.S. PATENT DOCUMENTS

| | | | |
|---|---|---|---|
| 3,904,001 | 9/1975 | Theyse et al. | 74/574 |
| 4,200,004 | 4/1980 | Bremer | 74/574 |
| 4,339,963 | 7/1982 | Bremer | 74/573 F |
| 4,422,347 | 12/1983 | Conseur | 74/574 |
| 4,655,728 | 4/1987 | Shimada | 464/180 |
| 4,680,984 | 7/1987 | Wahling et al. | 74/574 |
| 4,736,510 | 4/1988 | Jorg et al. | 74/574 |
| 4,764,152 | 8/1988 | Jorg et al. | 464/89 |

FOREIGN PATENT DOCUMENTS

| | | | |
|---|---|---|---|
| 3049109 | 7/1982 | Fed. Rep. of Germany | 464/180 |
| 3423222 | 12/1984 | Fed. Rep. of Germany | 74/574 |
| 3340253 | 5/1985 | Fed. Rep. of Germany | 74/574 |
| 3545401 | 7/1987 | Fed. Rep. of Germany | 74/573 F |
| 1504998 | 3/1978 | United Kingdom | 74/573 F |
| 1597760 | 9/1981 | United Kingdom | 74/573 F |

*Primary Examiner*—Vinh Luong

[57] ABSTRACT

A torsion-vibration damper comprising a driving ring and take-off ring that are rotatable relative to each other, segment chambers spaced from the axis of rotation, the chambers being bounded by the driving ring and the take-off ring and divided into subchambers by a partition, the subchambers being connected by at least one connecting opening and having at least one boundary formed of a resilient wall part.

10 Claims, 2 Drawing Sheets

TORSION-VIBRATION DAMPER

The present invention relates to torsion-vibration damping mechanisms, and more particularly, to a novel torsion-vibration damper that utilizes fluid-filled segment chambers that are subdivided into subchambers by a resilient wall and has at least one connecting opening between the subchambers.

A fluid damped engine coupling is disclosed in DE 31 20 407 to Hackforth, which is used to dampen oscillations in motor driven equipment. The Hackforth coupling has fluid filled chambers formed between radial arms and end plates, which are connected by holes between an inner and outer ring. The chambers are formed inelastically, however, providing damping action upon rotation of the two rings relative to the other of a fixed nature. The uniform damping action resulting from such inelastic structure fails to satisfactorily isolate high frequency vibrations, that is, vibrations having a small amplitude.

The present invention, on the other hand, provides a torsion-vibration damper having fluid-filled subchambers that are bounded in at least one subregion by resilient wall parts. The subchambers are thus capable of accommodating volume changes resulting from small relative rotations without pressure such that no fluid is forced through the connecting opening between the subchambers. Torsional vibrations of small amplitudes are therefore satisfactorily isolated using the present invention.

In addition to the above objects and advantages of the present invention, it is an object of the present invention to provide a torsion vibration damper that produces good damping action for torsional vibrations having large amplitudes. When subjected to torsional vibrations of large amplitude, a pressure increase is alternatingly exchanged between subchambers which causes fluid to pass through the connecting opening from the subchamber having a higher pressure to the subchamber having a lower pressure. As a result, good damping action is obtained with respect to torsional vibrations of large amplitude.

It is another object of the present invention to provide a torsion-vibration damper with constant operating behavior over long periods of time.

It is still another object of the present invention to provide a torsion-vibration damper that is easily adaptable to various applications.

These and other objects are achieved by the present invention, which provides a torsion-vibration damper comprising, in a preferred embodiment, a driving ring and a take-off ring which can be rotated relative to each other and which define fluid-filled segment chambers having a uniform distance from the axis of rotation. The segment chambers are bounded in the circumferential direction by the walls of the one ring and are subdivided into two chambers by a partition located within the segment chambers and fastened to the other ring. The subchambers are bounded in at least one subregion by resilient wall parts and are connected by at least one opening.

These and other objects and advantages will be apparent from a consideration of the following detailed description in conjunction with the appended drawings.

DETAILED DESCRIPTION OF THE INVENTION

Figure 1:
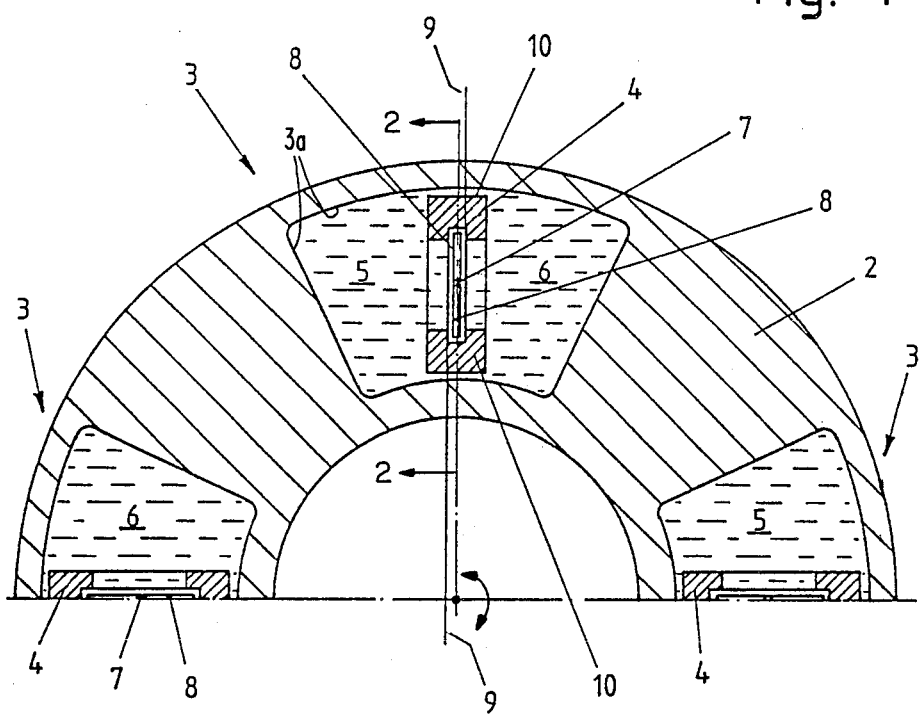
FIG. 1 is a half-sectional front view of an embodiment of the present invention taken along line 1—1 of FIG. 2.
Figure 2:
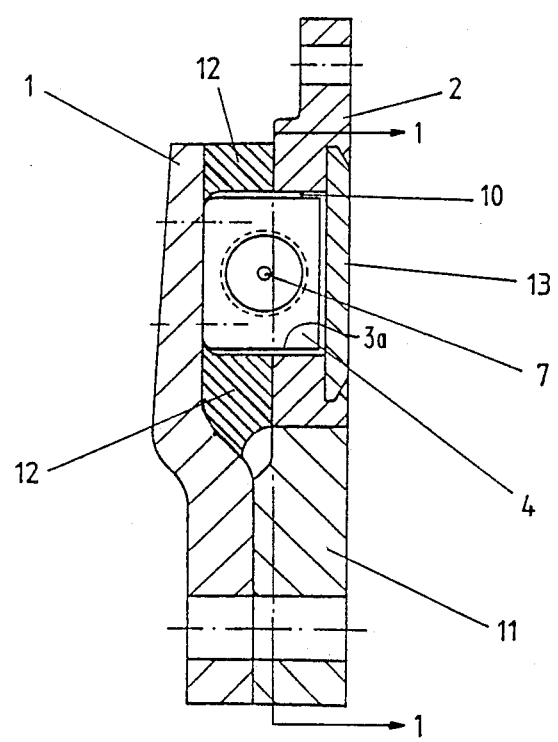
FIG. 2 is a half-sectional side view of the embodiment of FIG. 1 taken along line 2—2 of FIG. 1.

As shown in FIGS. 1 and 2, the torsion-vibration damper comprises a driving ring 1 and a take-off ring 2, which together bound four segment chambers 3 uniformly distributed along the circumference of the torsion-vibration damper, at a distance from the axis of rotation. The segment chambers 3 are undetachably connected to the rubber spring body 12 which surrounds the segment chambers 3. The take-off ring 2 has at the end face an annular recess which is sealed fluid-tight by a peened-over sealing lid 13. The sealing lid 13 forms an integral part of the take-off ring 2 during operation of the torsion-vibration damper.

The segment chambers 3, which are surrounded at their circumference 3a by the take-off ring 2, the spring body 12 and the driving ring 1, are filled with a suitable damping fluid. The segment chambers 3 contain partitions 4 that extend substantially in the radial direction and are secured at the driving ring 1 against rotation by suitable fasteners schematically shown at 15 in FIG. 2. Chambers 3 are sealed by a circular sealing lip 10 against the spring body 12, the take-off ring 2 and the sealing lid 13 in a movable manner.

The partitions 4 contain in the middle portion a resilient wall part 8 in the form of a thin stiff limitation that subdivides the segments chambers 3 into two subchambers 5, 6 and includes at least one connecting opening 7 between the subchambers 5, 6. The resilient wall part 8 may be designed to move back and forth between stops 9.

The size and the play of the resilient wall part 8 is designed so that, when the driving ring 1 of the torsion vibration damper is subjected to torsional vibrations with a small amplitude, no change of pressure in the subchambers 5, 6 occurs and no fluid is forced through the connecting opening 7. In such an instance, no damping action occurs and the torsional vibrations are satisfactorily isolated and not felt in the take-off ring 2.

When the driving ring 1 of the torsion vibration damper is subjected to torsional vibrations of large amplitude, the resilient wall part 8 is moved into alternating contact with the stops 9 and fluid is pushed through the opening 7 into the subchamber 5, 6 of lower pressure. This results in good damping action with respect to torsional vibrations of large amplitude.

A guiding ring 11 or other centering means may be used, as shown in FIG. 2, to assure a rotation-symmetrical relationship between the take-off ring 2 and the driving ring 1. The guide ring 11 is particularly recommended for torsion-vibration dampers having small dimensions, however, the torsion-vibration damper of the present invention can be used without such a guiding ring 11, as shown in FIG. 1.

Figure 3:
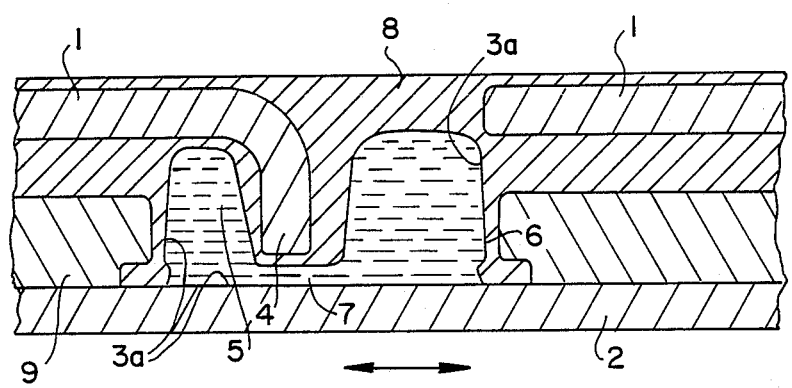
FIG. 3 is a sectional top view of another embodiment of the present invention in which the rings have been flattened to appear linear for purposes of clarity.

In another embodiment of the present invention, as shown in FIG. 3, the torsion-vibration damper includes a partition 4 that is formed integrally with the driving ring 1 and the resilient wall part 8 is arranged between the subchamber 6 and the ambient air. An inertial mass 9 is connected to the take-off ring 2, allowing the torsion-vibration damper to be used as a vibration canceller. The subchambers 5, 6 are formed in a wall region bounded at their circumference 3a by resilient wall part 8. The effectiveness of this embodiment of the torsion-vibration damper is increased if the various parts of the torsion-vibration damper are arranged symmetrically about the axis of rotation.

If torsional vibrations with a small amplitude are introduced, resilient wall part 8 prevents the occurrence of a pressure increase in the subchambers 5, 6, thereby isolating the vibrations satisfactorily. If, on the other hand, torsional vibrations with a large amplitude are introduced, fluid is forced through the connecting opening 7 into the subchamber 5, 6 of lower pressure, thus obtaining choke action which serves to damp the torsional vibrations.

The torsion-vibration damper of the present invention is essentially governed by four factors:

1. The ratio of the resonance frequency $$\sqrt{\frac{A_K}{H\rho L}}$$

of the fluid column in the connecting opening 7 and the torsional resonance frequency of the torsion-vibration damper without fluid filling $$\sqrt{\frac{C}{I_D}}$$

for tuning the damping maximum, where
C = stiffness of the rubber spring body 12
$A_K$ = cross section of the connecting opening 7
$I_D$ = the moment of inertia of the torsion-vibration damper mass
$\rho$ = the density of the damping fluid
L = the length of the connecting opening 7
H = the volume resilience 2. The ratio of of the viscous time $$\frac{S^2\rho}{\eta}$$

and the period of the torsional vibration $$\sqrt{\frac{I_D}{C}}$$

for the tuning of the wideband property of the damping curve, where
S = a characteristic length of the flow in the connecting opening 7
$\eta$ = the viscosity of the damping fluid 3. The ratio of the hydraulic stiffness at frequencies $$\frac{\omega}{\sqrt{e/I_D}} \gg 1; \frac{A_H^2 R^2}{H}$$

to the proportional torsion stiffness C/N, for tuning the dynamic hardening, where $\omega$ = the frequency
$A_H$ = the displacing area
R = the effective radius of the displacement
N = the numbers of hydraulic subchambers 4. The ratio of the area of the connecting opening $A_K$ and the displacing area $A_H$.

The volume resiliency H can intentionally be made dependent on the amplitude so that the damping and hardening can be adjusted as a function of the relative amplitude.

The following numerical ranges are contemplated for the present invention:

$$10^{-3} \leq \frac{A_K I_D}{H\rho LC} \leq 10^3 \quad \text{1.}$$

$$10^{-3} \leq \frac{\rho S^2}{\eta} \sqrt{\frac{C}{I_D}} \leq 10^3 \quad \text{2.}$$

$$10^{-3} \leq \frac{NA_H^2 R^2}{HC} \leq 10^2 \quad \text{3.}$$

$$10^{-3} \leq \frac{A_K}{A_H} \leq 1 \quad \text{4.}$$

In the torsion-vibration damper according to the present invention, all dimensions are tied to the shape so that good reproducibility in production is assured. For metallic parts, customary tolerances are appropriate. The use of highly damping rubber mixtures, which are difficult to process, is eliminated since the damping action derives from the damping fluid.

Any known damping fluid may be used advantageously in the present invention. Propane diol is one example of a low cost damping fluid that is especially well suited. A mixture of glycol and water is another example of a suitable damping fluid.

The resilient wall parts 8 of the segment chambers 3 may consist of thin-walled diaphragms of elastomeric or plastomeric materials, which have particularly high resilience that allows bulk absorption largely without pressure when subjected to torsional vibrations having small amplitudes. Use of thin-walled, stiff laminations that are held through ring diaphragms by the surrounding wall parts is also contemplated in connection with the present invention.

The resilient wall parts 8 may be located between the subchambers 5, 6 and the ambient air, which facilitates controlling the function of the torsion-vibration damper. This arrangement is recommended for applications in which the torsion-vibration damper is subjected to major external mechanical stresses.

The magnitude of the torsional amplitude at which the damping effect sets in, for the torsion-vibration damper according to the present invention, can be fixed very accurately if the movement of the movable wall parts is limited by stops. This design is recommended particularly in those cases in which high-frequency interference vibratins which must be isolated, occur in addition to low-frequency vibrations, which require damping.

The resilient wall parts can also be suspended elastically so that a gradual transition from the undamped operating state of the torsion-vibration damper to that of the damped one is obtained. In such a design, the use of stops may be unnecessary, thereby eliminating the problem of stop noises that may occur if stops are used.

The resilient wall parts can be designed in one piece with the sealing elements sealing the driving and take-off rings from each other and/or from the partition, which further facilitates reproducibility. An integral design with rubber-elastic spring bodies is also possible which causes restoration of the rings into a neutral position after relative rotation of the rings.

The operating behavior of the torsion-vibration damper mode according to the present invention can be easily modified to handle various applications, for instance, by only partially filling the segment chambers 3 with damping fluid or by utilizing a damping fluid having a different viscosity.

In addition to the variations and modifications to the disclosed torsion-vibration damper that have been suggested, many other variations and modifications will be apparent to those skilled in the art and, accordingly, the scope of the present invention is not to be construed as limited to the specific embodiments shown or suggested but is rather to be defined by the appended claims.

What is claimed is:

1. A torsion-vibration damper for isolating small amplitude torsional vibrations and damping large amplitude torsional vibrations comprising:
    first and second rings having walls rotatable relative to each other about an axis of rotation;
    at least one liquid-filled chamber spaced from the axis of rotation, said chamber being circumferentially bounded by a wall of said first ring;
    said second ring including a partition dividing said at least one liquid-filled chamber into subchambers;
    at least one passage connecting said subchambers permitting flow therebetween for damping large amplitude torsional vibrations; and
    a resilient wall part forming at least part of the boundary of said subchambers, said resilient wall part isolating small amplitude torsional vibrations.

2. The torsion-vibration damper of claim 1 wherein said resilient wall part is disposed between said subchambers and ambient air.

3. The torsion-vibration damper of claim 1 wherein at least part of the resilient wall part is disposed between said subchambers.

4. The torsion-vibration damper of claim 1 further comprising stops between which at least part of the resilient wall part is movable.

5. The torsion-vibration damper of claim 1 wherein said resilient wall part comprises a single part connected between said first and second rings.

6. The torsion-vibration damper of claim 5 wherein the inherent resiliency of said resilient wall part causes restoration of the rings after relative rotation of the rings.

7. The torsion-vibration damper of claim 6 wherein one of said ring is embedded in said resilient wall part.

8. The torsion-vibration damper of claim 7 wherein said partition is integrally formed with the ring embedded in the resilient wall part.

9. The torsion-vibration damper of claim 5 wherein said resilient wall part seals the rings from each other.

10. The torsion-vibration damper of claim 9 further comprising an inertial mass connected to said resilient wall part and said second ring.

* * * * *